(12) United States Patent
Shim et al.

(10) Patent No.: US 12,065,072 B1
(45) Date of Patent: Aug. 20, 2024

(54) AUTO AIMING AND AUTO LEVELING CONTROL SYSTEM FOR HEADLAMPS

(71) Applicants: HYUNDAI MOTOR COMPANY, Seoul (KR); KIA CORPORATION, Seoul (KR)

(72) Inventors: Joon Bo Shim, Hanam-si (KR); Seung Woo Seo, Gyeongsan-si (KR); Jae Joon Park, Gyeongsan-si (KR); Seung Gyu Nam, Gyeongsan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/529,022

(22) Filed: Dec. 5, 2023

(30) Foreign Application Priority Data

Aug. 23, 2023 (KR) .......................... 10-2023-0110776

(51) Int. Cl.
*B60Q 1/115* (2006.01)
*B60Q 1/00* (2006.01)

(52) U.S. Cl.
CPC ............ *B60Q 1/115* (2013.01); *B60Q 1/0023* (2013.01); *B60Q 2300/114* (2013.01); *B60Q 2300/13* (2013.01)

(58) Field of Classification Search
CPC .................. B60Q 1/115; B60Q 1/0023; B60Q 2300/114; B60Q 2300/13
USPC .......................................................... 362/446
See application file for complete search history.

(56) References Cited

U.S. PATENT DOCUMENTS

| | | | |
|---|---|---|---|
| 8,820,986 B2 * | 9/2014 | Yamazaki | B60Q 1/10 362/465 |
| 10,676,016 B2 * | 6/2020 | Kasaba | B60Q 1/08 |
| 10,956,954 B2 * | 3/2021 | Poltorak | H04H 60/59 |
| 11,560,082 B2 | 1/2023 | Kang | |
| 2017/0327030 A1 * | 11/2017 | Kim | B60Q 1/115 |
| 2019/0092223 A1 | 3/2019 | Buhmann et al. | |
| 2019/0160999 A1 * | 5/2019 | Bauch | B60Q 1/10 |
| 2022/0144160 A1 | 5/2022 | Kang | |

FOREIGN PATENT DOCUMENTS

| | | | | |
|---|---|---|---|---|
| DE | 102015208795 A1 * | 11/2016 | ............. | B60Q 1/115 |
| KR | 101061215 B1 | 8/2011 | | |
| KR | 102396264 B1 | 5/2022 | | |

* cited by examiner

*Primary Examiner* — Laura K Tso
(74) *Attorney, Agent, or Firm* — Lempia Summerfield Katz LLC (57) ABSTRACT

Disclosed is an auto aiming and auto leveling control system which simplifies initial aiming of a headlamp, and links an aiming process to a leveling process of the headlamp, so as to reduce manufacturing costs and to enable process automation.

14 Claims, 5 Drawing Sheets

AUTO AIMING AND AUTO LEVELING CONTROL SYSTEM FOR HEADLAMPS

CROSS-REFERENCE TO RELATED APPLICATION

This application claims priority to Korean Patent Application No. 10-2023-0110776, filed on Aug. 23, 2023, the disclosure of which is incorporated herein by reference in its entirety.

BACKGROUND

1. Technical Field

The present disclosure relates to an auto aiming and auto leveling control system for headlamps which adjusts the light radiation direction of an optical module.

2. Description of the Related Art

In general, a mobility vehicle is provided with lighting apparatuses used to help the driver see objects in the driving direction of the mobility vehicle and to inform other vehicles or road users of the driving state of the mobility vehicle when driving at night. A headlamp is a lamp attached to the front of a mobility vehicle to illuminate the road ahead in the driving direction of the mobility vehicle.

In other words, the head lamp radiates light in the driving direction of the mobility vehicle, so as to secure a field of view on the road ahead and thus to confirm other vehicles and obstacles, thereby achieving safe driving of the mobility vehicle.

When headlamps are mounted in mobility vehicles, an aiming process is required, and the aiming process is distinguished from a leveling process of adjusting the light radiation direction of the headlamp when driving the mobility vehicle.

Recently, automation to enhance productivity of mobility vehicles is desired. To aim a conventional headlamp, the current working process involves a worker manually aiming the headlamp using an aiming tool after confirming results from an aiming measurement apparatus. Therefore, a worker is required for the aiming process of the headlamps, and the aiming process becomes complicated because the same operation with respect to both headlamps, i.e., left and right headlamps, should be performed.

The above information disclosed in the Background section is provided only to enhance understanding of the background of the present disclosure and should not be interpreted as conventional technology that is already known to those of having ordinary skilled in the art.

SUMMARY

The present disclosure provides an auto aiming and auto leveling control system for headlamps that automatically performs aiming of a headlamp, and links the auto aiming process to a leveling process of the headlamp, thereby reducing manufacturing costs and accomplishing the automation process.

In an embodiment of the present disclosure, an auto aiming and auto leveling control system for headlamps includes a sensing module including a measurement sensor configured to scan a road surface below a mobility vehicle so as to collect road surface information, and a first acceleration sensor configured to collect acceleration information of the mobility vehicle. The auto aiming and auto leveling control system further includes a lamp module including an optical module configured to radiate light and adjust a light radiation direction, and a second acceleration sensor configured to collect acceleration information of the mobility vehicle. The auto aiming and auto leveling control system also includes a first controller provided in the sensing module and configured to collect a change amount of an acceleration direction from the first acceleration sensor and a change amount of the road surface from the measurement sensor and configured to determine a change amount of a road surface angle. The auto aiming and auto leveling control system also includes: a second controller provided in the lamp module and configured to collect a change amount of an acceleration direction from the second acceleration sensor and the change amount of the road surface angle input from the first controller and to adjust the light radiation direction of the optical module.

The measurement sensor of the sensing module may be a Time of Flight (ToF) sensor, and may enable measurement at a plurality of resolutions.

The sensing module may be installed at a lower portion of the mobility vehicle, and the lamp module may be a headlamp.

In one embodiment, the sensing module may further include a sensor housing installed at a lower portion of the mobility vehicle and having a lens provided on a lower surface of the sensor housing. In one form, the measurement sensor and the first acceleration sensor may be disposed adjacent to each other in the sensor housing.

In one embodiment, the lamp module may further include a lamp housing having a lens, the optical module may be installed to be tiltable in the lamp housing, and the second acceleration sensor may be installed on a tilting shaft of the lamp module.

In one embodiment, the lamp module may further include a leveling driver, and the leveling driver may be connected to the optical module. In particular, upon receiving a command from the second controller, the leveling driver may tilt the optical module so as to automatically adjust leveling of the optical module based on the light radiation direction.

In one embodiment, the lamp module may further include an aiming mechanism, and the aiming mechanism may be configured to fix a position of the optical module and to adjust aiming of the optical module based on the light radiation direction by external manipulation.

The measurement sensor may set a scan area to the road surface, and the first controller may acquire the change amount of the road surface by repeating a process of deducing data on a plane from data about the scan area input from the measurement sensor through linear regression and causing dispersion of the corresponding data to fall within a predetermined reference range.

The first controller may store a road surface setting value based on the road surface information including a distance to the road surface measured by the measurement sensor, and may store an acceleration setting value based on a direction of gravity measured by the first acceleration sensor, in a state in which the sensing module is placed on a worktable configured to simulate a mounted state of the sensing module in the mobility vehicle before the sensing module is mounted in the mobility vehicle.

The second controller may store an acceleration setting value based on a direction of gravity measured by the second sensor, and may adjust the light radiation direction of the optical module so as to determine an initial aiming angle, in a state in which the lamp module is placed on a worktable configured to have a screen and to simulate a mounted state of the lamp module in the mobility vehicle before the lamp module is mounted in the mobility vehicle.

The first controller may determine the change amount of the acceleration direction based on information input from the first acceleration sensor and the acceleration setting value, and further determine the change amount of the road surface based on information input from the measurement sensor and the road surface setting value. first controller may determine the change amount of the road surface angle using the change amount of the acceleration direction and the change amount of the road surface.

The second controller may determine the change amount of the acceleration direction based on information input from the second acceleration sensor and the acceleration setting value, and may determine an aiming angle of the optical module based on the change amount of the road surface angle input from the first controller and the acceleration setting value.

When the light radiation direction of the optical module is forcibly adjusted by external manipulation, the first controller and the second controller may re-store the road surface setting value and the respective acceleration setting values.

When a signal indicating completion of forcible adjustment of the light radiation direction of the optical module by external manipulation is input, the first controller and the second controller may store the surface setting value and the respective acceleration setting values at a predetermined time before a point in time when the forcible adjustment of the light radiation direction of the optical module has been completed.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION

Hereinafter, reference is made in detail to embodiments of the present disclosure, examples of which are illustrated in the accompanying drawings. Wherever possible, the same reference numbers are used throughout the drawings to refer to the same or like parts.

In the following description of the embodiments, suffixes, such as "module", "part" and "unit", are provided or used interchangeably merely in consideration of ease in statement of the present disclosure, and do not have meanings or functions distinguished from one another.

In the following description of the embodiments of the present disclosure, a detailed description of known functions and configurations incorporated herein has been omitted when it may make the subject matter of the present disclosure rather unclear. Further, the accompanying drawings are exemplarily given to describe the embodiments of the present disclosure, and should not be construed as being limited to the embodiments set forth herein. The embodiments of the present disclosure are provided only to enhance understanding of the present disclosure and should cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular expressions may be intended to include plural expressions as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

A controller may include a communication device configured to communicate with other controllers or sensors so as to control functions served by the controller, a memory configured to store operating systems or logic commands and input and output information, and at least one processor configured to perform determination, calculation, decision, etc. required to control the functions served by the controller.

Hereinafter, an auto aiming and auto leveling control system for headlamps according to one embodiment of the present disclosure is described with reference to the accompanying drawings.

Figure 1:
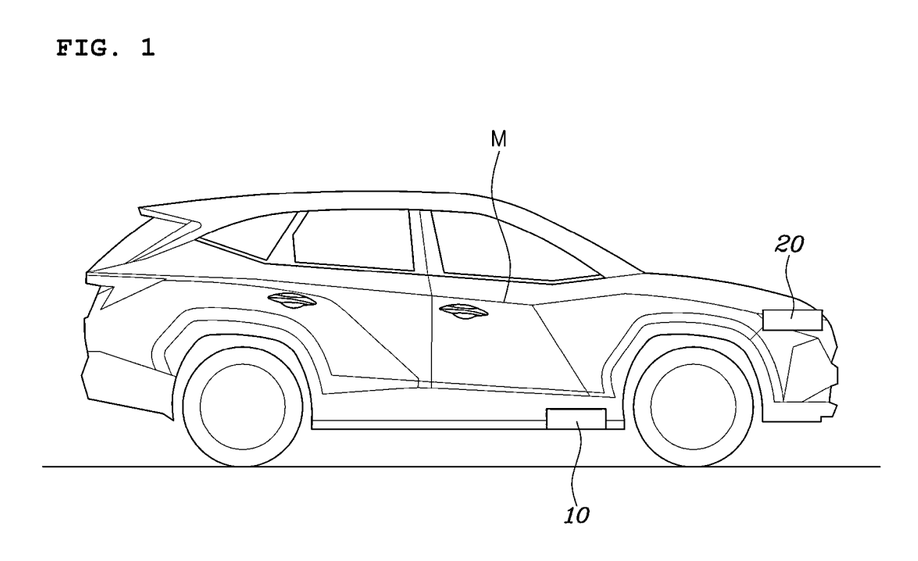
FIG. 1 is a schematic view of an auto aiming and auto leveling control system for headlamps according to one embodiment of the present disclosure.
Figure 2:
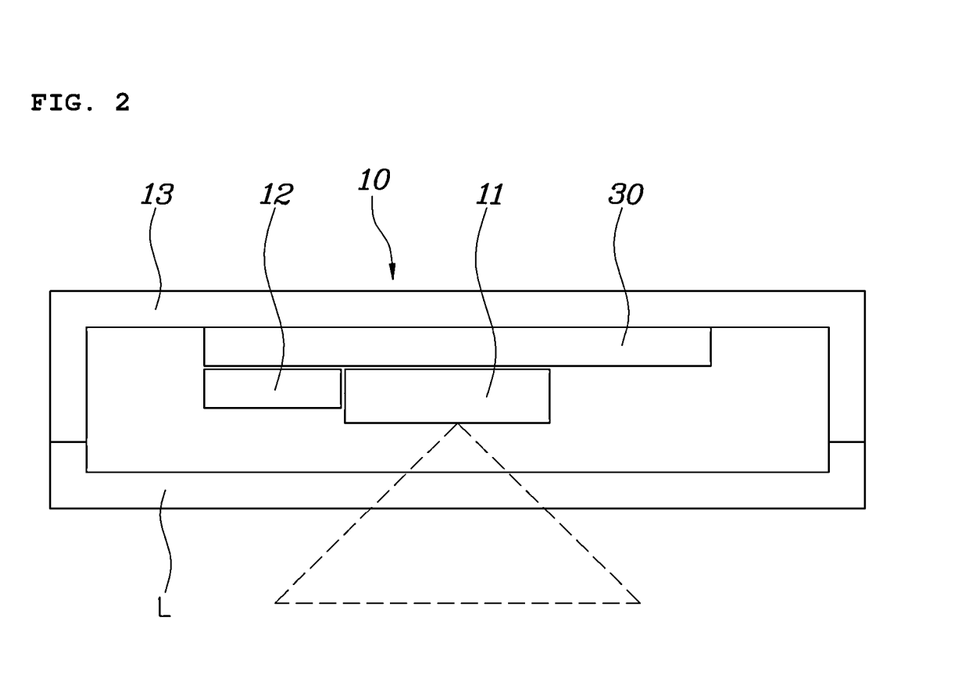
FIG. 2 is a view showing a sensing module of the auto aiming and auto leveling control system according to one embodiment of the present disclosure shown in FIG. 1.
Figure 3:
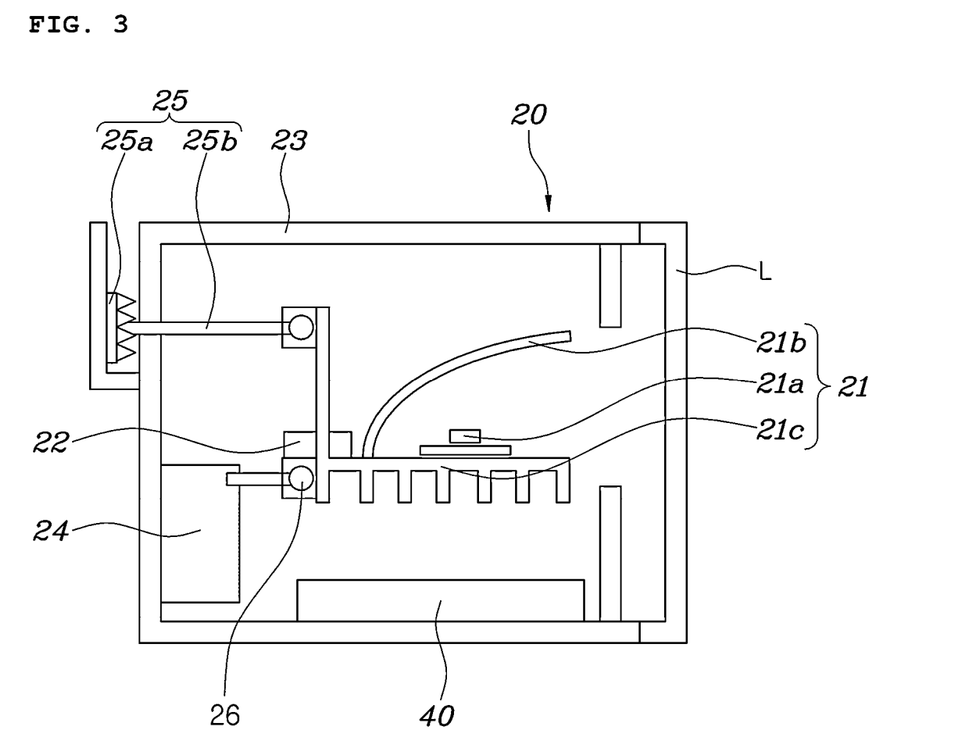
FIG. 3 is a view showing a lamp module of the auto aiming and auto leveling control system according to one embodiment of the present disclosure shown in FIG. 1.

As shown in FIGS. 1 to 3, according to an embodiment of the present disclosure, the auto aiming and auto leveling control system for headlamps includes: a sensing module 10 including a measurement sensor 11 configured to scan a road surface below a mobility vehicle M so as to collect road surface information, and a first acceleration sensor 12 configured to collect acceleration information. The auto aiming and auto leveling control system includes a lamp module 20 including an optical module 21 configured to radiate light and to adjust a light radiation direction, and a second acceleration sensor 22 configured to collect acceleration information. The auto aiming and auto leveling control system further includes: a first controller 30 provided in the sensing module 10 and configured to collect a change amount of an acceleration direction provided by the first acceleration sensor 12 and a change amount of a road surface provided by the measurement sensor 11 and to determine a change amount of a road surface angle. The auto aiming and auto leveling control system also includes a second controller 40 provided in the lamp module 20 and configured to collect a change amount of an acceleration direction provided by the second acceleration sensor 22 and the change amount of the road surface angle input from the first controller 30 and to adjust the light radiation direction of the optical module 21.

The sensing module 10 may include the measurement sensor 11 and the first acceleration sensor 12, and the sensing module 10 and the first controller 30 may be modularized. The measurement sensor 11 may be a Time of Flight (ToF) sensor using laser, ultrasonic waves, and a camera, and may detect the state of the road surface, and the first acceleration sensor 12 may acquire acceleration information in the direction of gravity.

In other words, the measurement sensor 11 of the sensing module 10 may be a Time of Flight (ToF) sensor, and may be configured to enable measurement at a plurality of resolutions, thereby being capable of measuring the road surface angle without mechanical action.

In one embodiment, the sensing module 10 may include a sensor housing 13 installed at the lower portion of the mobility vehicle "M" and having a lens "L" provided on the lower surface of the sensor housing 13, and the measurement sensor 11 and the first acceleration sensor 12 may be disposed adjacent to each other in the sensor housing 13.

As the sensor housing 13 is installed at the lower portion of the mobility vehicle M, the measurement sensor 11 may scan the road surface. The inside of the sensor housing 13 is sealed by the lens L provided on the lower surface of the sensor housing 13, and the measurement sensor 11 may scan the road surface through the lens L so as to collect the road surface information.

Further, by disposing the measurement sensor 11 and the first acceleration sensor 12 adjacent to each other in the sensor housing 13, errors among the road surface information measured by the measurement sensor 11 in the direction of gravity confirmed by the first acceleration sensor 12 may be minimized.

Further, the sensor housing 13 is located at the lower portion of the mobility vehicle M and thus influences of sunlight and environmental conditions (snowfall, obstacles, etc.) on the sensor housing 13 are suppressed, and an effect equivalent to placement of a ToF sensor on the optical module 21 based on the direction of gravity of the first acceleration sensor 12 located in the sensing module 10 and the second acceleration sensor 22 located in the optical module 21 may be expected.

The lamp module 20 may include the optical module 21 and the second acceleration sensor 22, and the second acceleration sensor 22 may be installed on the optical module 21. The optical module 21 may include a light source 21a and a reflector 21b, and light radiated by the light source 21a may be reflected by the reflector 21b, and may then be emitted to the outside. Further, the optical module 21 may include a heat sink 21c configured to radiate heat generated from the light source 21a, and the heat sink 21c may be provided to be tiltable by external power and the light radiation direction may be adjusted thereby. The second acceleration sensor 22 may acquire acceleration information in the direction of gravity.

The lamp module 20 may include a lamp housing 23 having a lens L, the optical module 21 may be installed to be tiltable in the lamp housing 230, and the second acceleration sensor 22 may be installed on the tilting shaft 26 of the lamp module 20.

As shown in FIG. 3, the optical module 21 is installed in the lamp housing 23, and the optical module 21 is installed to be tiltable and may thus implement a leveling function through conversion of the light radiation direction. Particularly, the second acceleration sensor 22 may be installed on the tilting shaft of the lamp module 20, accuracy in the light radiation direction of the optical module 21 in the direction of gravity confirmed by the second acceleration sensor 22 may be secured.

In more detail, the lamp module 20 may further include a leveling driver 24 and an aiming mechanism 25.

The leveling driver 24 may be connected to the optical module 21, and may be configured to tilt the optical module 21 so as to automatically adjust leveling of the optical module 21 based on the light radiation direction, when a command from the second controller 40 is input. The aiming mechanism 25 may be configured to fix the position of the optical module 21 and to adjust aiming of the optical module 21 based on the light radiation direction of the optical module 21 by external manipulation.

As such, the optical module 21 may be installed in the lamp housing 23 through the leveling driver 24 and the aiming mechanism 25.

The leveling driver 24 may include an actuator provided in the lamp housing 23 and configured to be operated by a command received from the second controller 40. The leveling driver 24 may be connected to the optical module 21 in various ways, such as a gear connection method, a belt connection structure, etc., and may adjust the tilting angle of the optical module 21 when power is transmitted to the leveling driver 24 based on whether or not the leveling driver 24 is operated.

Here, the aiming mechanism 25 may include an aiming operator 25a and an aiming link 25b. The aiming operator 25a may be exposed to the outside of the lamp housing 23 so that a worker may directly adjust the position of the aiming operator 25a, and the aiming link 25b may change the tilting position of the optical module 21 based on the position of the aiming operator 25a. The aiming operator 25a may be provided outside the lamp housing 23 to be vertically movable, and may be configured such that the position of the aiming operator 25a may be adjusted upwards and downwards using a specific tool. The aiming link 25b may be configured such that one end thereof is connected to the aiming operator 25a and the other end thereof is connected to the optical module 21, so as to change the tilting angle of the optical module 21 in connection with movement of the position of the aiming operator 25a.

The leveling operator 24 and the aiming mechanism 25 may be connected to the upper and lower portions of the optical module 21 so as to be spaced apart from each other.

As such, the optical module 21 may adjust the light radiation direction through the leveling operator 24 and the aiming mechanism 25, and the leveling driver 24 may adjust leveling of the optical module 21 under the control of the controllers 30 and 40 based on the driving situation of the mobility vehicle M. The aiming mechanism 25 may adjust aiming of the optical module 21 based on the light radiation direction when the lamp module 20 is mounted in the mobility vehicle M or aiming is adjusted due to deformation of parts.

Here, leveling indicates automatic adjustment of the light radiation direction of the optical module 21 based on change in the posture of the mobility vehicle M, a road state, etc., and aiming indicates adjustment of the light radiation direction of the lamp module 20 to satisfy the laws and regulations of each country or region, and may be performed by a worker.

The sensing module 10 is installed at the lower portion of the mobility vehicle M such that the measurement sensor 11 collects the road surface information, and the lamp module 20 includes a headlamp and is configured such that light emitted by the optical module 21 is projected in the driving direction of the mobility vehicle M.

Thereby, the first controller 30 and the second controller 40 may adjust the light radiation direction of the optical module 21 based on information input through the respective sensors provided in the sensing module 10 and the lamp module 20.

In more detail, the first controller 30 may collect the change amount of the acceleration direction confirmed by the first acceleration sensor 12 and the change amount of the road surface confirmed by the measurement sensor 11, and then determines the change amount of the road surface angle.

Further, the second controller 40 may collect the change amount of the acceleration direction confirmed by the second acceleration sensor 22 and the change amount of the road surface angle input from the first controller 30, and may adjust the light radiation direction of the optical module 21.

Here, the measurement sensor 11 may set a scan area to the road surface, and the first controller 30 may acquire the change amount of the road surface by repeating a process of deducing data on a plane from data about the scan area input from the measurement sensor 11 through linear regression and causing dispersion of the corresponding data to fall within a predetermined reference range.

In other words, the measurement sensor 11 sets the scan area having a designated range on the road surface, and transmits data about the scan area to the first controller 30. Because the data scanned by the measurement sensor 11 is configured to have shorter distances as the data gets closer to the periphery from the center of the scan area, and the data represents the shape of a curved surface. Thereby, the first controller 30 determines data on the plane from the data about the scan area input from the measurement sensor 11 through linear regression. Here, the first controller 30 may obtain road surface information in which errors are reduced due to dispersion falling within the predetermined reference range, by (i) acquiring information on the plane by applying a predictor variable to a data set having the curved surface shape through linear regression, and (ii) repeating linear regression so that the dispersion of the data on the plane falls within the predetermined reference range.

As such, the first controller 30 may acquire the change amount of a road surface direction based on the road surface information provided by the measurement sensor 11.

The first controller 30 pre-stores setting values to determine the change of the road surface angle based on information input from the measurement sensor 11 and the acceleration sensor 12, and the second controller 40 pre-stores setting values to adjust the light radiation direction of the optical module 21.

The first controller 30 stores a road surface setting value based on road surface information including a distance to the road surface measured by the measurement sensor 11, and stores an acceleration setting value based on the direction of gravity measured by the first acceleration sensor 12, in the state in which the sensing module 10 is placed on a worktable configured to simulate the mounted state of the sensing module 10 in the mobility vehicle M before the sensing module 10 is mounted in the mobility vehicle M.

In other words, the sensing module 10 is separately manufactured and mounted in the mobility vehicle M, and information measured by the measurement sensor 11 and the first acceleration sensor 12 is collected in advance, in the state in which the manufactured sensing module 10 is placed on the worktable configured to simulate the mobility vehicle M to which the sensing module 10 is to be applied.

Accordingly, the first controller 30 stores the road surface setting value based on the road surface information including the distance to the road surface input from the measurement sensor 11, and the first controller 30 further stores the acceleration setting value based on acceleration information in the direction of gravity input from the first acceleration sensor 12, in the state in which the sensing module 10 is placed on the worktable.

Further, the second controller 40 stores an acceleration setting value based on the direction of gravity measured by the second sensor 22, and adjusts the light radiation direction of the optical module 21 so as to determine an initial aiming angle, in the state in which the lamp module 20 is placed on a worktable configured to have a screen and to simulate the mounted state of the lamp module 20 in the mobility vehicle M before the lamp module 20 is mounted in the mobility vehicle M.

The lamp module 20 may be separately manufactured and mounted in the mobility vehicle M, information measured by the second acceleration sensor 22 is collected in advance, and aiming of the optical module 21 is controlled, in the state in which the manufactured lamp module 20 is placed on the worktable configured to simulate the mobility vehicle M to which the lamp module 20 is to be applied.

Accordingly, the second controller 40 adjusts the light radiation direction based on the position of light from the optical module 21 projected onto the screen, stores the adjusted light radiation direction, and stores the acceleration setting value based on acceleration information in the direction of gravity input from the second acceleration sensor 12, in the state in which the lamp module 20 is placed on the worktable.

As described above, the first controller 30 and the second controller 40 pre-store the respective setting values before the sensing module 10 and the lamp module 20 are mounted in the mobility vehicle M, and controls aiming of the lamp module 20 based on the respective setting values stored in the first controller 30 and the second controller 40 when the sensing module 10 and the lamp module 20 are mounted in the mobility vehicle M. Thereby, a separate aiming process is not required after the sensing module 10 and the lamp module 20 have been mounted in the mobility vehicle M and thus manufacturing processes may be shortened, and thereafter, control of leveling may be performed based on the setting values stored in the respective controllers 30 and 40 when driving the mobility vehicle M.

Control of aiming and leveling based on the respective setting values stored in the first controller 30 and the second controller 40 is performed as below.

The first controller 30 may determine the change amount of the acceleration direction based on information input from the first acceleration sensor 12 and the acceleration setting value, may determine the change amount of the road surface based on information input from the measurement sensor 11 and the road surface setting value, and may determine the change amount of the road surface angle using the change amount of the acceleration direction and the change amount of the road surface.

The second controller 40 may determine the change amount of the acceleration direction based on information input from the second acceleration sensor 22 and the acceleration setting value, and may determine an aiming angle of the optical module 21 from the change amount of the road surface angle input from the first controller 30 and the acceleration setting value.

Figure 4:
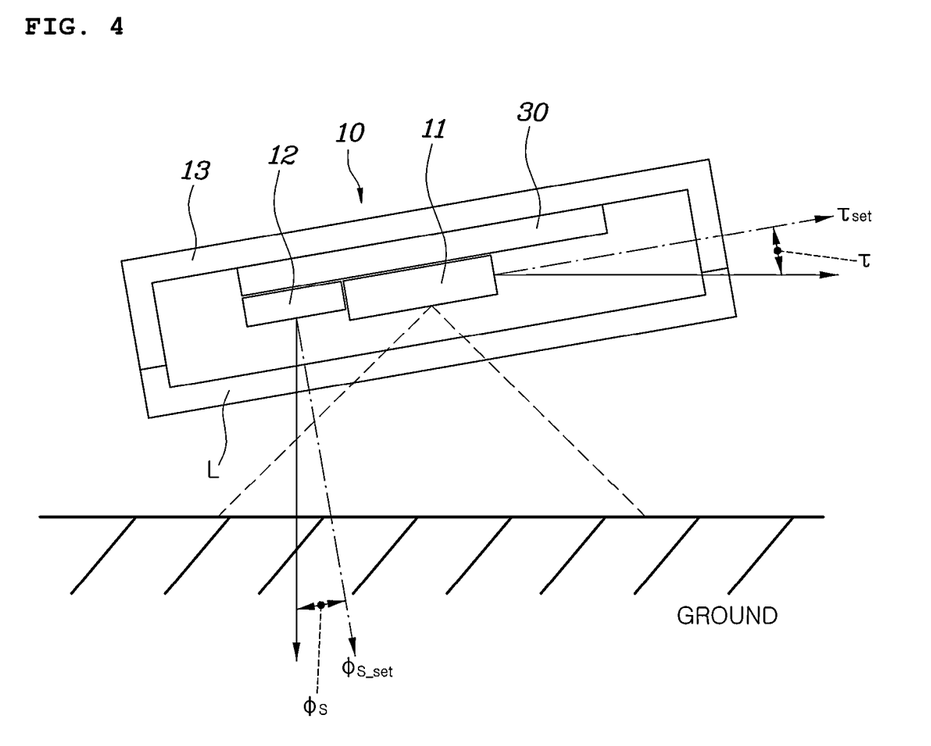
FIG. 4 is a view illustrating the sensing module of the auto aiming and auto leveling control system according to one embodiment of the present disclosure.

In more detail, referring to FIG. 4, when power is applied after mounting the sensing module 10 in the mobility vehicle M, the first acceleration sensor 12 may measure the change amount $\Phi_s$ of the acceleration direction based on the acceleration setting value $\Phi_{s\_set}$, and the measurement sensor 11 may measure the change amount τ of the road surface based on the road surface setting value $τ_{set}$. Thereby, the first controller 30 may determine the change amount $θ_{ground}$ of the road surface angle based on the direction of gravity by collecting the change amount $\Phi_s$ of the acceleration direction and the change amount τ of the road surface. The change amount $θ_{ground}$ of the road surface angle may be calculated by subtracting the change amount $\Phi_s$ of the acceleration direction from the change amount τ of the road surface, and the first controller 30 may store the change amount $θ_{ground}$ of the road surface angle, and may transmit the change amount $θ_{ground}$ of the road surface angle to the second controller 40.

Figure 5:
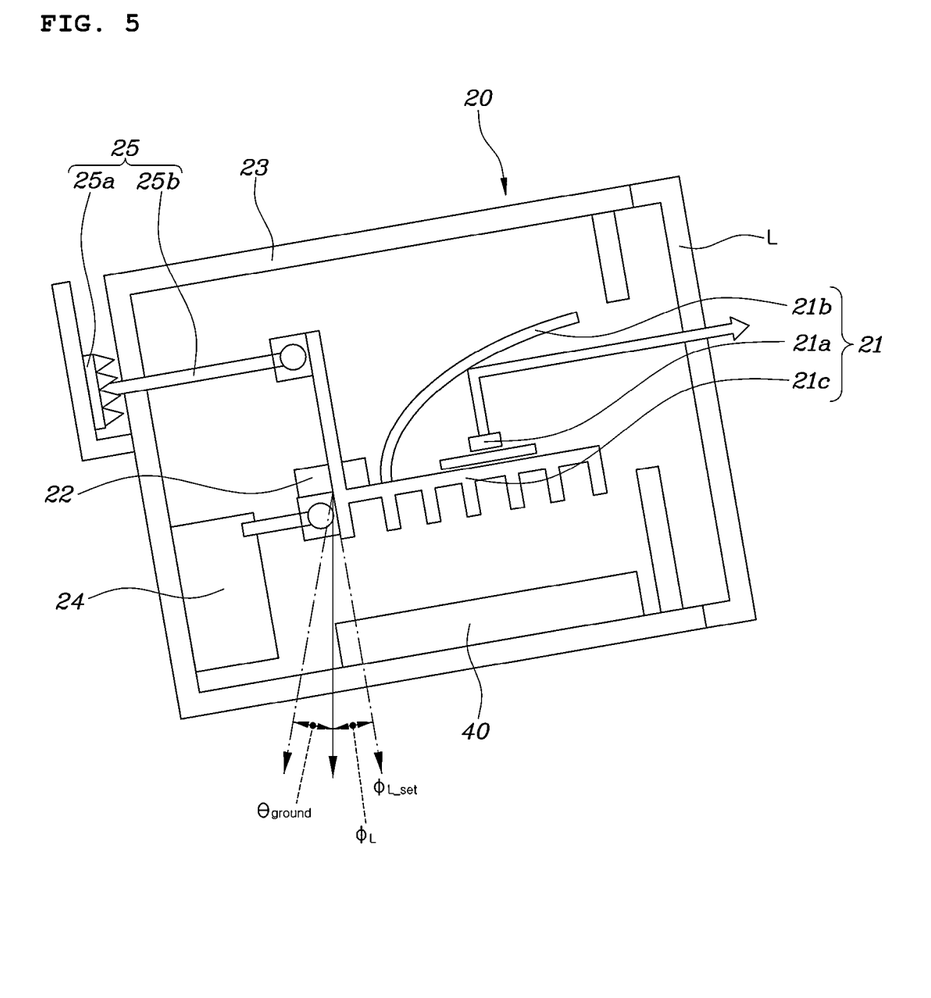
FIG. 5 is a view illustrating the lamp module of the auto aiming and auto leveling control system according to one embodiment of the present disclosure.

Further, referring to FIG. 5, when power is applied after mounting the lamp module 20 in the mobility vehicle M, the second acceleration sensor 22 may measure the change amount $\Phi_L$ of the acceleration direction based on the acceleration setting value $\Phi_{L\_set}$. Here, the second controller 40 corrects the aiming angle of the optical module 21 based on the change amount $\Phi_L$ of the acceleration direction and the change amount $θ_{ground}$ of the road surface angle input from the second controller 40. The aiming angle of the optical module 21 may be determined by adding the change amount $θ_{ground}$ of the road surface angle to the change amount $\Phi_L$ of the acceleration direction, and the second controller 40 may detect accuracy in aiming of the optical module 21 by confirming whether or not the aiming angle of the optical module 21 coincides with a value acquired by subtracting the change amount $θ_{ground}$ of the road surface angle from the change amount $\Phi_L$ of the acceleration direction after adjusting the aiming angle of the optical module 21.

As described above, in the present disclosure, when the sensing module 10 and the lamp module 20 are separately manufactured, the respective controllers 30 and 40 provided in the sensing module 10 and the lamp module 20 may store respective setting values to adjust aiming of the lamp module 20, aiming of the lamp module 20 may be adjusted based on the respective setting values depending on the state of the corresponding mobility vehicle M when power is applied after mounting the sensing module 10 and the lamp module 20 in the mobility vehicle M, and thereafter, leveling control of the lamp module 20 may be performed during driving of the mobility vehicle M.

Further, the first controller 30 and the second controller 40 may re-store the road surface setting value, and the acceleration setting values, i.e., a first acceleration setting value and a second acceleration setting value, when the light radiation direction of the optical module 21 is forcibly adjusted by external manipulation.

The light radiation direction of the optical module 21 may be changed due to various situations including deterioration of respective parts including the lamp module 20. Thereby, the lamp module 20 may control aiming of the optical module 21 by mechanically forcibly adjusting the light radiation direction of the optical module 21. Here, aiming of the optical module 21 may be controlled through the above-described aiming mechanism 25.

When aiming of the optical module 21 is forcibly adjusted, the first controller 30 may store a road surface setting value based on road surface information including a distance to the road surface measured by the measurement sensor 11 and an acceleration setting value based on a direction of gravity measured by the first acceleration sensor 12, and the second controller 40 may store an acceleration setting value based on a direction of gravity measured by the second acceleration sensor 22, and an adjusted light radiation direction of the optical module 21.

Here, the aiming angle of the optical module 20 may be returned by the respective acceleration information acquired by the first acceleration sensor 12 of the sensing module 10 and the second acceleration sensor 22 of the lamp module 20 during forcibly adjustment of aiming of the optical module 21, and thus, when a signal indicating completion of forcible adjustment of the light radiation direction of the optical module 21 by external manipulation is input, the first controller 30 and the second controller 40 store the surface setting value, the first acceleration setting value, and the second acceleration setting value at a predetermined time (for example, 10 seconds) before a point in time when forcible adjustment of the light radiation direction of the optical module 21 has been completed.

Here, the point in time when forcible adjustment of the light radiation direction of the optical module 21 has been completed may be a point in time when a hood configured to be opened to mount the lamp module 20 in the mobility vehicle M is closed or a worker transmits a signal through external input or communication.

Accordingly, the first controller 30 and the second controller 40 may repetitively store the road surface setting value, the first acceleration setting value, and the second acceleration setting value over time, during forcibly adjustment of the light radiation direction of the optical module 21 by external manipulation, and may store the surface setting value, the first acceleration setting value, and the second acceleration setting value the predetermined time before the point in time when forcible adjustment of the light radiation direction of the optical module 21 has been completed, thereby being capable of completing adjustment of aiming of the optical module 21.

The auto aiming and auto leveling control system having the above-described structure may simplify initial aiming of a headlamp, and may link an aiming process to leveling of the headlamp, thereby being capable of reducing manufacturing costs and enabling process automation.

As is apparent from the above description, an auto aiming and auto leveling control system having the above-described structure may simplify initial aiming of a headlamp, and may link an aiming process to leveling of the headlamp, thereby being capable of reducing manufacturing costs and enabling process automation.

Although the embodiments of the present disclosure have been disclosed for illustrative purposes, those having ordinary skill in the art should appreciate that various modifications, additions and substitutions are possible, without departing from the scope and spirit of the disclosure as disclosed in the accompanying claims.

What is claimed is:

1. An auto aiming and auto leveling control system for headlamps, comprising:
a sensing module comprising a measurement sensor configured to scan a road surface below a mobility vehicle so as to collect road surface information, and a first acceleration sensor configured to collect acceleration information of the mobility vehicle;

a lamp module comprising an optical module configurated to radiate light and adjust a light radiation direction, and a second acceleration sensor configured to collect acceleration information of the mobility vehicle;

a first controller provided in the sensing module and configured to:
  collect a change amount of an acceleration direction confirmed by the first acceleration sensor and a change amount of the road surface from the measurement sensor, and
  determine a change amount of a road surface angle; and a second controller provided in the lamp module and configured to:
  collect a change amount of an acceleration direction from the second acceleration sensor and the change amount of the road surface angle input from the first controller, and
  adjust the light radiation direction of the optical module.

2. The auto aiming and auto leveling control system according to claim 1, wherein the measurement sensor of the sensing module is a Time of Flight (ToF) sensor, and enables measurement at a plurality of resolutions.

3. The auto aiming and auto leveling control system according to claim 1, wherein the sensing module is installed at a lower portion of the mobility vehicle, and the lamp module is a headlamp.

4. The auto aiming and auto leveling control system according to claim 1, wherein the sensing module further comprises a sensor housing installed at a lower portion of the mobility vehicle and having a lens provided on a lower surface of the sensor housing, and the measurement sensor and the first acceleration sensor are disposed adjacent to each other in the sensor housing.

5. The auto aiming and auto leveling control system according to claim 1, wherein the lamp module further comprises a lamp housing having a lens, the optical module is installed to be tiltable in the lamp housing, and the second acceleration sensor is installed on a tilting shaft of the lamp module.

6. The auto aiming and auto leveling control system according to claim 1, wherein the lamp module further comprises a leveling driver, and
  wherein when a command from the second controller is input, the leveling driver is connected to the optical module and is configured to tilt the optical module so as to automatically adjust leveling of the optical module based on the light radiation direction.

7. The auto aiming and auto leveling control system according to claim 1, wherein the lamp module further comprises an aiming mechanism, and
  wherein the aiming mechanism is configured to fix a position of the optical module and adjust aiming of the optical module based on the light radiation direction by external manipulation.

8. The auto aiming and auto leveling control system according to claim 1, wherein:
  the measurement sensor sets a scan area to the road surface; and
  the first controller is configured to acquire the change amount of the road surface by repeating a process of deducing data on a plane from data about the scan area input from the measurement sensor through linear regression and causing dispersion of the corresponding data to fall within a predetermined reference range.

9. The auto aiming and auto leveling control system according to claim 8, wherein the first controller is configured to:
  store a road surface setting value based on the road surface information comprising a distance to the road surface measured by the measurement sensor, and
  store an acceleration setting value based on a direction of gravity measured by the first acceleration sensor, in a state in which the sensing module is placed on a worktable configured to simulate a mounted state of the sensing module in the mobility vehicle before the sensing module is mounted in the mobility vehicle.

10. The auto aiming and auto leveling control system according to claim 9, wherein the second controller is configured to:
  store an acceleration setting value based on a direction of gravity measured by the second acceleration sensor, and
  adjust the light radiation direction of the optical module so as to determine an initial aiming angle, in a state in which the lamp module is placed on a worktable configured to have a screen and to simulate a mounted state of the lamp module in the mobility vehicle before the lamp module is mounted in the mobility vehicle.

11. The auto aiming and auto leveling control system according to claim 10, wherein the first controller is configured to:
  determine the change amount of the acceleration direction based on information input from the first acceleration sensor and the acceleration setting value,
  determine the change amount of the road surface based on information input from the measurement sensor and the road surface setting value, and
  determine the change amount of the road surface angle using the change amount of the acceleration direction and the change amount of the road surface.

12. The auto aiming and auto leveling control system according to claim 11, wherein the second controller is configured to:
  determine the change amount of the acceleration direction based on information input from the second acceleration sensor and the acceleration setting value, and
  determine an aiming angle of the optical module based on the change amount of the road surface angle input from the first controller and the acceleration setting value.

13. The auto aiming and auto leveling control system according to claim 10, wherein when the light radiation direction of the optical module is forcibly adjusted by external manipulation, the first controller and the second controller are configured to re-store the road surface setting value and the respective acceleration setting values.

14. The auto aiming and auto leveling control system according to claim 13, wherein, when a signal indicating completion of forcible adjustment of the light radiation direction of the optical module by external manipulation is input, the first controller and the second controller are configured to store the surface setting value and the respective acceleration setting values at a predetermined time before a point in time when the forcible adjustment of the light radiation direction of the optical module has been completed.

* * * * *